Jan. 12, 1954            O. M. NOREHAD            2,666,005
PACKING CORDS, ESPECIALLY ADAPTED TO FUNCTION AS A SEALING
GASKET FOR DRUMS, PAILS, AND BARRELS, IN WHICH LARD
AND OTHER SHORTENINGS ARE CONFINED FOR SHIPMENT
Filed May 10, 1950

INVENTOR.
Onnig M. Norehad
BY
Clarence E. Sheedy,
His Attorney

Patented Jan. 12, 1954

2,666,005

UNITED STATES PATENT OFFICE 2,666,005

PACKING CORDS, ESPECIALLY ADAPTED TO FUNCTION AS A SEALING GASKET FOR DRUMS, PAILS, AND BARRELS, IN WHICH LARD AND OTHER SHORTENINGS ARE CONFINED FOR SHIPMENT

Onnig M. Norehad, Chicago, Ill.

Application May 10, 1950, Serial No. 161,046

1 Claim. (Cl. 154—53.6)

This invention relates to certain new and useful improvements in packing cords especially adapted to function as a sealing gasket for drums, pails and barrels in which lard and other shortenings are confined for shipment.

A principal object of this invention is to provide a packing cord which is substantially non-absorbent and flexible to an extent such that the cord will not break while being forced into a sealing position between the cover and the open end portion of the drum, pail or barrel.

Another object of the invention is to provide either by spraying, dipping, or any other method, an outer coating which will render the cord non-absorbent and flexible and protect the cord from breakage when compressed in a sealing position.

Yet another and equally important object of the invention is to provide a packing cord which may be manufactured at an economical cost and one which will be highly efficient in use.

Other objects will appear hereinafter.

The invention consists in the novel combination and arrangement of parts to be hereinafter described and claimed.

The invention will be best understood by reference to the accompanying drawings showing the preferred form of construction, and in which.

The efficiency of a packing cord in a large measure is dependent upon the non-absorbent and flexible character of the cord. This is especially true when the packing cord is employed for sealing the cover on a drum, pail or barrel containing lard or like substance. In such use of a packing cord, the non-absorbent character and flexibility of such cord is highly desirable for the reason that, if the cord is absorbent, ultimately the lard or other substance will penetrate through the cord. If the cord is not of a flexible character there is the danger of the cord being crushed and thereby providing seepage holes through which the lard or other substance may find passage.

Figure 1:
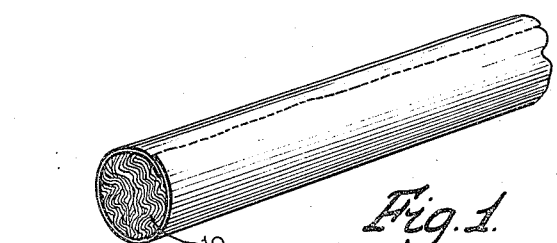
Fig. 1 is an elongated fragmentary perspective view of the packing cord embodying my invention.
Figure 2:
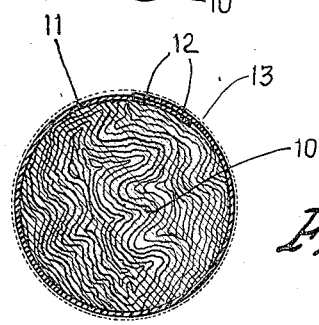
Fig. 2 is a cross sectional detail view of the same.

To accomplish the several objects of my invention, and referring more particularly to the form of construction shown in Figs. 1 and 2, I provide a packing cord which comprises a core 10. In this form of construction the core is formed by crimping and compressing transversely of its length tissue, crepe or other relatively thin paper sheets to form an elongated cylindrical body as shown in Figs. 1 and 2. Over this elongated cylindrical body I arrange an inner wrapping or sleeve 11 comprising a sheet of paper folded about the core 10 with its overlapping edges 12 adhesively secured together.

Over this inner covering 11 I provide by spraying, dipping or by any other method a plastic outer covering or sleeve 13. This plastic sleeve 13 performs the function of protecting the inner sleeve 11 against cracking, of rendering the core non-absorbent, and of increasing the flexibility of the same. As the outer sleeve provides an uninterrupted surface around the inner sleeve, there will result a perfect seating of the cord when in sealing position between the cover and the pail, drum or barrel, with greater efficiency than that of packing cords now in commercial use.

Figure 3:
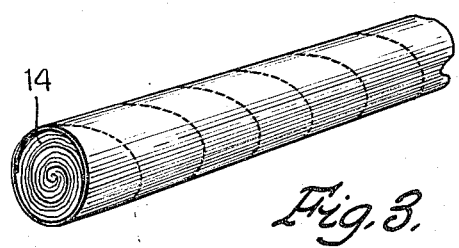
Fig. 3 is a fragmentary elongated perspective view similar to Fig. 1, but showing a modified form of construction.
Figure 4:
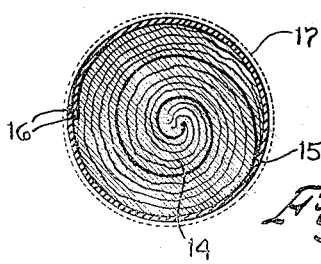
Fig. 4 is a cross sectional detail view of the same.

The form illustrated in Figs. 3 and 4 is substantially the same as that shown in Figs. 1 and 2, with the exception that the core 14 is formed by gathering the long edges of the paper sheet together by twisting the sheet spirally with respect to its long axis. The inner cover or sleeve 15 for the core 14 is spirally wound upon the core 14 with overlapping edges 16 adhesively secured together.

Like in Figs. 1 and 2, over this spiral wrapping I provide by dipping, spraying or by any other method a plastic outer seamless sleeve 17.

The finished packing cord by this plastic outer covering or sleeve is prevented from becoming unwound in the event of defect in the adhesive sealing of the overlapping edges of the inner cover or sleeve. The packing cord when complete is relatively light in weight and may be used for many purposes.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A packing cord comprising an elongated core formed of compressed paper twisted spirally about its longitudinal axis, a spirally wound inner sleeve surrounding the core in intimate relation with respect to the core and having overlapping edge portions adhesively secured together, and an outer plastic seamless sleeve circumposed on the inner sleeve in intimate relation with the inner sleeve and providing a continuous and uninterrupted cylindrical surface around said inner sleeve.

ONNIG M. NOREHAD.

References Cited in the file of this patent

UNITED STATES PATENTS

| Number | Name | Date |
| --- | --- | --- |
| 584,428 | Tucker | June 15, 1897 |
| 1,999,084 | Camerota | Apr. 23, 1935 |
| 2,107,467 | Buhler | Feb. 8, 1938 |
| 2,360,106 | Buhler | Oct. 10, 1944 |
| 2,447,168 | Dean | Aug. 17, 1948 |
| 2,459,721 | Paltorak | Jan. 18, 1949 |
| 2,486,387 | Bringolf | Nov. 1, 1949 |